United States Patent [19]

Shiono et al.

[11] Patent Number: 4,628,452
[45] Date of Patent: Dec. 9, 1986

[54] ELECTRONIC CASH REGISTER SYSTEM WITH INPUT VERIFICATION

[75] Inventors: Fusahiro Shiono, Habikino; Kensaku Komai, Yamatokoriyama, both of Japan

[73] Assignee: Sharp Kabushiki Kaisha, Osaka, Japan

[21] Appl. No.: 515,456

[22] Filed: Jul. 20, 1983

[30] Foreign Application Priority Data

Jul. 30, 1982 [JP] Japan .................................. 57-133934

[51] Int. Cl.4 ...................... G06F 15/02; G06F 15/21
[52] U.S. Cl. .................................... 364/405; 364/900
[58] Field of Search ................................. 364/400–401, 364/404–406, 200 MS File, 900 MS File; 235/2, 7 A, 7 R

[56] References Cited

U.S. PATENT DOCUMENTS 3,719,927  3/1973  Michels et al. .............. 364/406 X
3,816,711  6/1974  Bliss ........................... 235/12 C X
3,946,220  3/1976  Brobeck et al. ............. 364/405 X
4,138,733  2/1979  Tadakuma et al. ........... 364/900
4,234,932  11/1980  Gorgens et al. ............. 364/900
4,249,648  2/1981  Meyer .......................... 364/405 X
4,310,885  1/1982  Azcua et al. ................. 364/405
4,438,326  3/1984  Uchida ........................ 364/900 X
4,509,129  4/1985  Yatsunami et al. .......... 364/405 X

FOREIGN PATENT DOCUMENTS 0028127  6/1981  European Pat. Off. ............ 364/405

Primary Examiner—Gary V. Harkcom
Attorney, Agent, or Firm—Birch, Stewart, Kolasch & Birch

[57] ABSTRACT

An electronic cash register includes a first memory storing a table of upper and lower limits of money amounts defining allowable input ranges of amounts of money during various transactions. A second memory stores codes for defining the upper and lower limits of money amounts for the various transactions by reference to the table of amounts of money stored in the first memory.

4 Claims, 7 Drawing Figures

ELECTRONIC CASH REGISTER SYSTEM WITH INPUT VERIFICATION

BACKGROUND OF THE INVENTION

This invention generally relates to an electronic cash register system and, more particularly, to an electronic cash register system having a capability of checking an allowable input of various transactions of money to be registered.

In a prior art cash register, a method employed therein for checking an allowable input of various transactions of money to be registered comprises checking of the number of digits of money entered in the case representing the department registration (in order, for example, to effect a display indicating the digits checked is greater than, for example, six digits) or checking of the amount of money in the case of the sale of a check.

The prior art cash register of the type described above has such disadvantages that, in the case of the checking of the number of digits representing money to be registered, a limit of, for example, $50.00. or $370.00. cannot be set and that, according to the method of checking the amount of money itself, a random access memory (RAM) must have a large memory capacity for the storage of the value thereof.

SUMMARY OF THE INVENTION

This invention has been developed with a view to substantially eliminating the disadvantages inherent in the prior art cash register and has for its essential object to provide an allowable input of the amount of money to be registered as a result of various transactions without requiring a random access memory of increased memory capacity solely for the purpose of the storage of data for the checking thereof.

The above described object of this invention can be readily accomplished by providing an electronic cash register system with a first memory means storing a table of upper and lower limits of money values defininf allowable input ranges of the amount of transacted money to be registered, and a second memory means for the storage of codes responding to the upper and lower limits of money values defining the allowable input ranges stored in the first memory means.

The electronic cash register so constructed according to this invention is capable of performing the checking of the allowability of input of various transactions (functions) of money in terms of the checking of the allowable input of the amount of money, without requiring substantially increased memory capacity (except for the increase required to store the table of the upper and lower limits of money).

BRIEF DESCRIPTION OF THE DRAWINGS

This and other objects and features of this invention will readily be understood from the following description of a preferred embodiment of this invention made with reference to the accompanying drawings, in which.

DETAILED DESCRIPTION OF A PREFERRED EMBODIMENT

Figure 1:
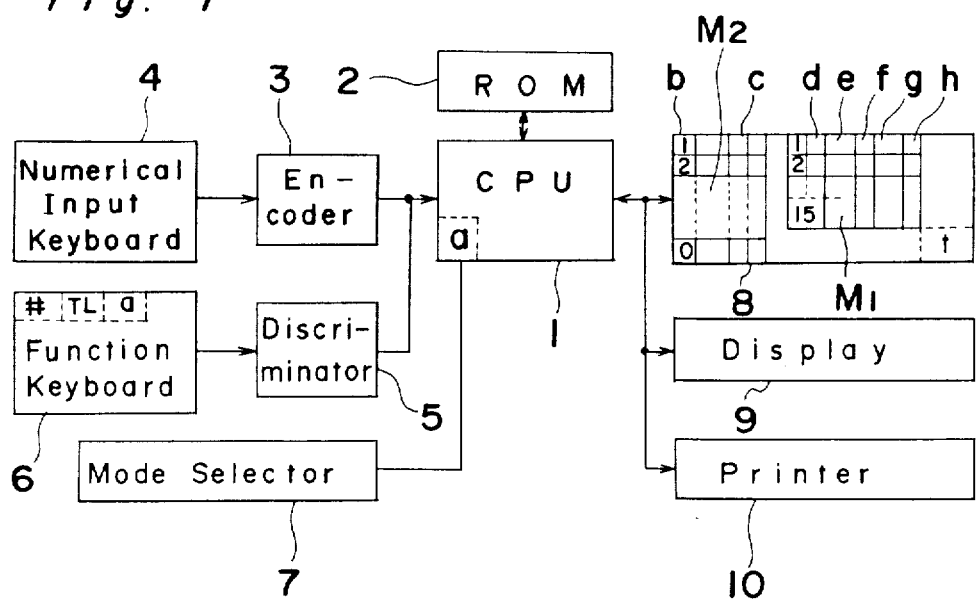
FIG. 1 is a block circuit diagram of an electronic cash register embodying this invention.

Referring first to FIG. 1, an electronic cash register comprises a central processing unit (CPU) 1 for processing information of various transactions, to which processing unit are connected a read-only memory 2 storing a program defining the procedures to deal with the various transactions, a numerical input keyboard 4 for supplying to CPU 1 through a key encoder 3 number information or money information associated with each of the transactions, a function keyboard 6 having a plurality of function keys for supplying to the CPU through a key discriminator 5 an instruction representing a particular procedure to deal with registration data associated with the respective transaction, a mode selector 7 for selecting the mode of operation of the device (i.e., one of setting, registration, and check and clear modes), a memory unit 8 for storing data of the respective transaction, a display unit 9 for providing a visual indication of the transaction data, and a printer 10 for printing the result of the respective transaction on a recording medium such as, for example, a receipt form, a journal or a slip.

Figure 2:
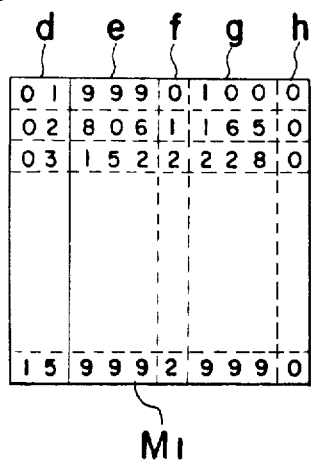
FIGS. 2 and 3 are diagrams showing respective memory areas of a memory unit used in the system shown in FIG. 1.

The CPU 1 has a storage area a for the storage of information indicating the operating mode of the register. The memory unit 8 has a storage area b for the storage of both a code for each department and a function code for each registration of the transaction of money to be registered, a storage area c for the storage of a table code (number of respective elements) representing a particular table to which reference should be made during the registration at each department, and a table area M1 (first memory means) for the storage of the upper and lower limits of money to be registered for each department. The table area M1 includes, as shown in FIG. 2 on an enlarged scale, a table code (element number) area d, an upper-limit area e, a lower-limit area g and storage areas f and h for the storage of exponents related to the upper and lower limits, respectively.

Figure 3:
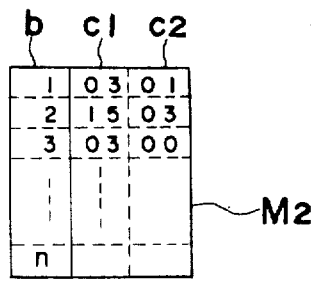

As shown in FIG. 3 on an enlarged scale, the storage areas b and c constitute a second memory means M2 for storing the upper and lower limits of amounts of money, which define allowable input ranges, corresponding to the table code (element number) stored in the memory means M1. In FIG. 3, reference characters C1 and C2 represent a table code (element number) storage area corresponding to the upper limit and a table code (element number) storage area corresponding to the lower limit.

The function keyboard 6 includes a JOB specifying key $\boxed{\#}$ for specifying a job such as, for example, a setting of the table of the upper and lower limits of money during the setting mode, a JOB executing key $\boxed{TL}$, an element No. specifying key $\boxed{a}$ and others.

The operation of the electronic cash register of the construction described above will now be described with reference to the flow charts shown respectively in FIGS. 4 and 6.

SETTING OPERATION

Prior to the use of the electronic cash register embodying this invention, an operator thereof must set various pieces of information at particular areas in the memory unit 8. This can be accomplished by the following procedure.

Figure 4:
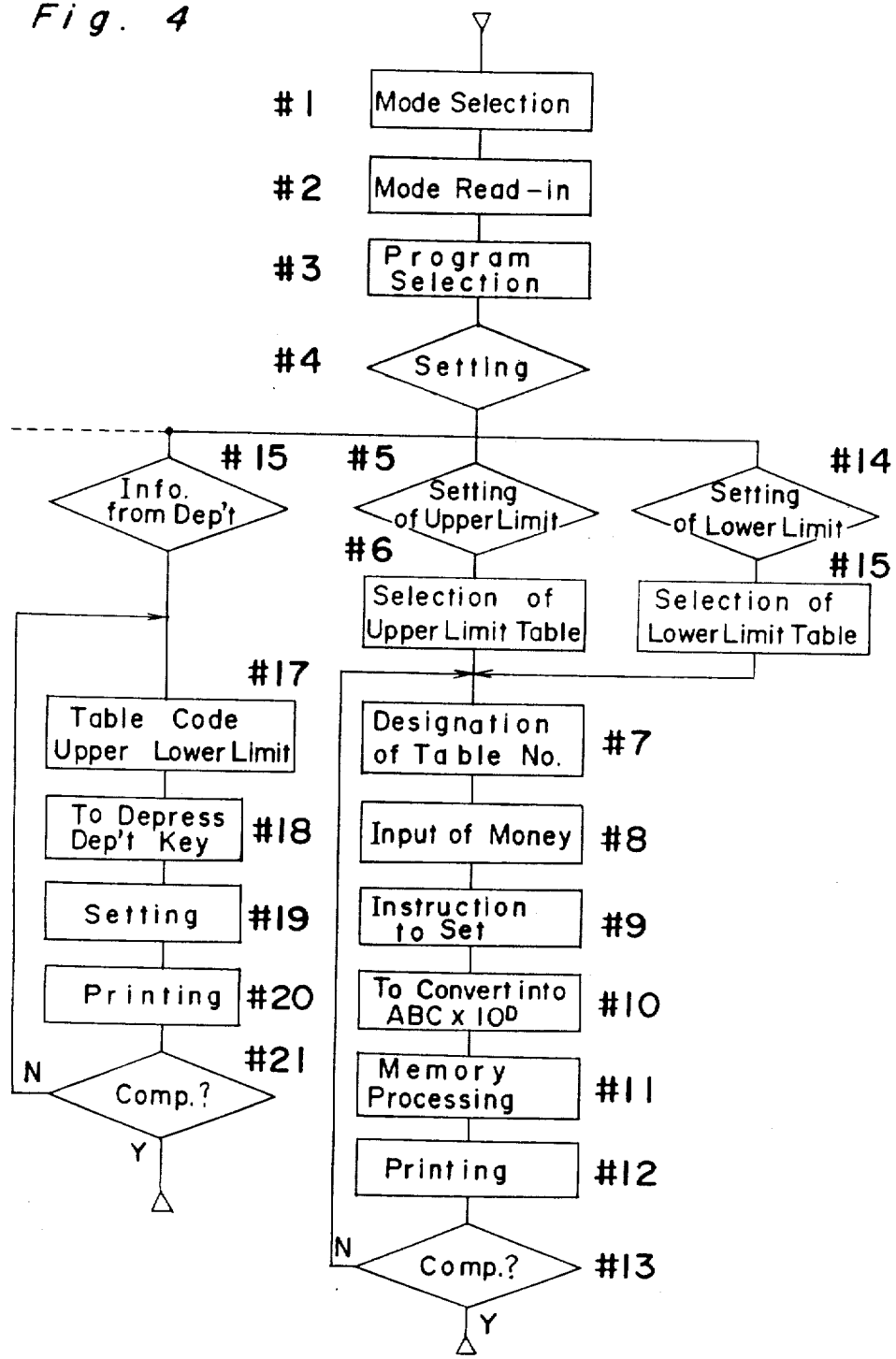
FIG. 4 is a flow chart showing the sequence of setting performed by the system.

Referring to FIG. 4, the operator manipulates the mode selector 7 to bring the cash register into the setting mode as shown by a MODE SELECTION block #1. At this time, as shown by a MODE READ-IN block #2, information indicating the setting mode is supplied to the area a of the CPU 1. In response to the input of the mode information, the CPU 1 selects a predetermined program out from the ROM 2 as shown by a PROGRAM SELECTION block #3 and establishes the setting mode as shown by a SETTING block #4.

When the operator subsequently operates the keyboard 4 and the JOB specifying key [#] to supply a predetermined JOB code to the CPU 1, and CPU 1 selects from the ROM 2 a predetermined program specified by the JOB code. By way of example, by manupulating the upper limit setting JOB code "242", the JOB specifying key [#] and the executing key [TL], the program for the setting of the upper limit can be selected as shown by SETTING OF UPPER LIMIT and SELECTION OF UPPER LIMIT TABLE blocks #5 and #6.

Thereafter, the operator inputs a particular element number of the table storage area M1, as shown by a DESIGNATION OF TABLE NO. block #7, to determine the area of the table storage area M1 in the memory unit 8 where the amount of money ready to be inputted is to be stored. The operator subsequently inputs the upper limit of money thereto as shown by an INPUT OF MONEY block #8 and depresses the executing key [TL] in the function keyboard 6, as shown by an INSTRUCTION TO SET block #9, to instruct the CPU 1 to set information of the amount of money. The CPU 1 when receiving this instruction converts the money information into a significant number of three digits and one-digit exponent information ($ABC \times 10^D$), as shown by a TO CONVERT INTO $ABC \times 10^D$ block #10, which are in turn inputted to and stored at predetermined areas e and f of the table area M1 in the memory unit 8 as shown by a MEMORY PROCESSING block #11. At the same time, the printer 10 is activated to print an indication thereof on the journal as shown by a PRINTING block #12.

The above described operation is repeated to complete the setting of the upper limit money information for all of the element numbers (1–15).

Similarly, manipulating a lower limit setting JOB code "243", the JOB specifying key [#] and the executing key [TL] as shown by a SETTING OF LOWER LIMIT block #14 causes the CPU 1 to select a program for the setting of the lower limit as shown by a SELECTION OF LOWER LIMIT TABLE block #15. By causing the procedures #7 to #13 to be sequentially repeated, the setting of the lower limit of money for all of the element numbers is completed.

Figure 5:
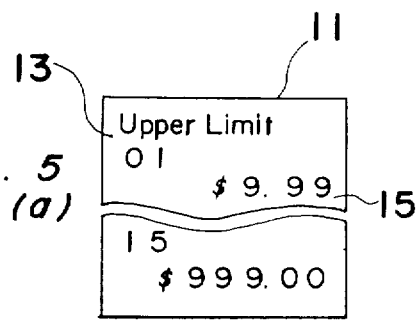
FIGS. 5(a) and 5(b) are diagrams showing examples of slips in which the upper and lower limits of money are printed out, respectively.
Figure 5:
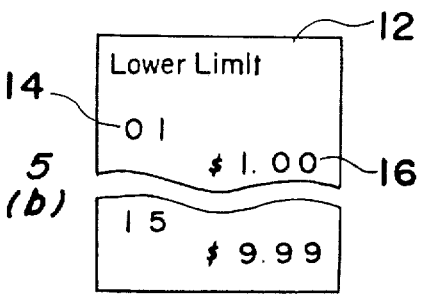

By way of example, assuming that $9.99, . . . and $999.00. are respectively set for the element numbers 1 and 15 as the upper limit and that $1.00, . . . and $9.99. are respectively set for the element numbers 1 and 15 as the lower limit, the keyboard manipulation is carried out in such a way as to enter in sequence "242", [#], [TL], "1", [a], "999", [TL], . . . , "15", [a], "99900" and finally [TL] for the setting of the upper limit and "243", [#], [TL], "1", [a], "100", [TL], . . . , "15", [a], "999", and finally [TL] for the setting of the lower limit. By this procedure, such data as shown in FIG. 2 are set and stored in the respetive areas e, f, g and h of the memory area M1. Tables 11 and 12 respectively setting forth the upper and lower limits are printed out by the printer 10 as shown in FIGS. 5(a) and 5(b), respectively. In FIGS. 5(a) and 5(b), reference numerals 13 and 14 represent respective table codes (element numbers) and reference numerals 15 and 16 represent the upper and lower limits printed, respectively.

Subsequently, by the utilization of the keyboards 4 and 6, the operator inputs a predetermined JOB code to the CPU 1 so that information to be referred to at the time of each transaction in each department, as stored in the table of information set in the above described manner, can be set. The CPU 1, upon receipt of this JOB code, selects and specifies a program in the ROM 2 for the setting of information from the department as shown by a INFO. FROM DEP'T block #16. Data subsequently inputted are processed according to this program.

More specifically, the operator inputs the element numbers of the table area M1 to be referred to during transactions for the department, in the form of information of 4 digits. The two high-order digits represent the upper limit while the two low-order digits represent the lower limit. This is indicated by a TABLE CODE UPPER & LOWER LIMITS block #17. The operator then depresses a relevant department key, as shown by a TO DEPRESS DEP'T KEY block #18, to cause the element number thereof to be inputed to and stored in the area c of the memory unit 8 for such department as shown by a MEMORY SETTING block #19. Then, the information so set is printed out by the printer 10 as shown by a PRINTING block #20.

By way of example, where the upper and lower limits are to be set $152.00. and $1.00., respectively, "03" and "01" should be input as the element numbers for the upper and lower limits and stored in the areas c1 and c2 corresponding to the department 1 of the memory means M2 as shown in FIG. 3 so that the allowable input range for such department 1 can be established.

Where there is neither an upper limit or lower limit, the element number "00" is to be set.

While the foregoing description is directed to the setting of the allowable input range for each department, the element numbers for the upper and lower limits can be stored at the storage area c corresponding to each function number by performing a similar method even in the case of functions such as, for example, the transaction of sale by a check, the sale and purchase transaction, the registration of discounts and the registration of credits, in which the allowable input range of the amount of money to be inputted is required to be checked.

By setting and storing the allowable input range in the manner described hereinbefore, the memory capacity required for the setting can advantageously been reduced remarkedly. That is to say, since the memory capacity required for the setting of the upper limit table is for only a three-digit significant number plus a one-digit exponent, 2 bytes, for each element, only $2 \times 15 = 30$ bytes is required for all of the elements.

Similarly, the memory capacity required for the setting of the lower limit is 30 bytes.

Furthermore, the memory capacity necessary for the setting of the table element numbers for the functions that require the checking of allowable input range is one digit times 2 equal to 1 byte, i.e., 1 digit ×2=1 byte, for each function.

On the other hand, in the case with the prior art, the limit of the amount of money is set in as-is form and 4 bytes (7-digit amount of money) is required for each of the upper and lower limits, i.e., 8 bytes in total. The prior art technique can therefore accommodate the limits for only 8 or 9 functions in a memory capacity equal to the memory capacity employed in the invention for 15 functions.

Thus, where the limits (upper and lower) of the amount of money for a number of functions are to be set as money information, this invention effectively reduces the required memory capacity.

Although reference has been made to the amount of money consisting of 3 significant digits, this invention should not be limited thereto. However, in the case of the setting of the upper and lower limits of the amounts of money to be input, the 3-digit significant number is practical and satisfactory.

The operation of the cash register in the registration mode will now be described with reference to FIG. 6.

Registering Operation

Figure 6:
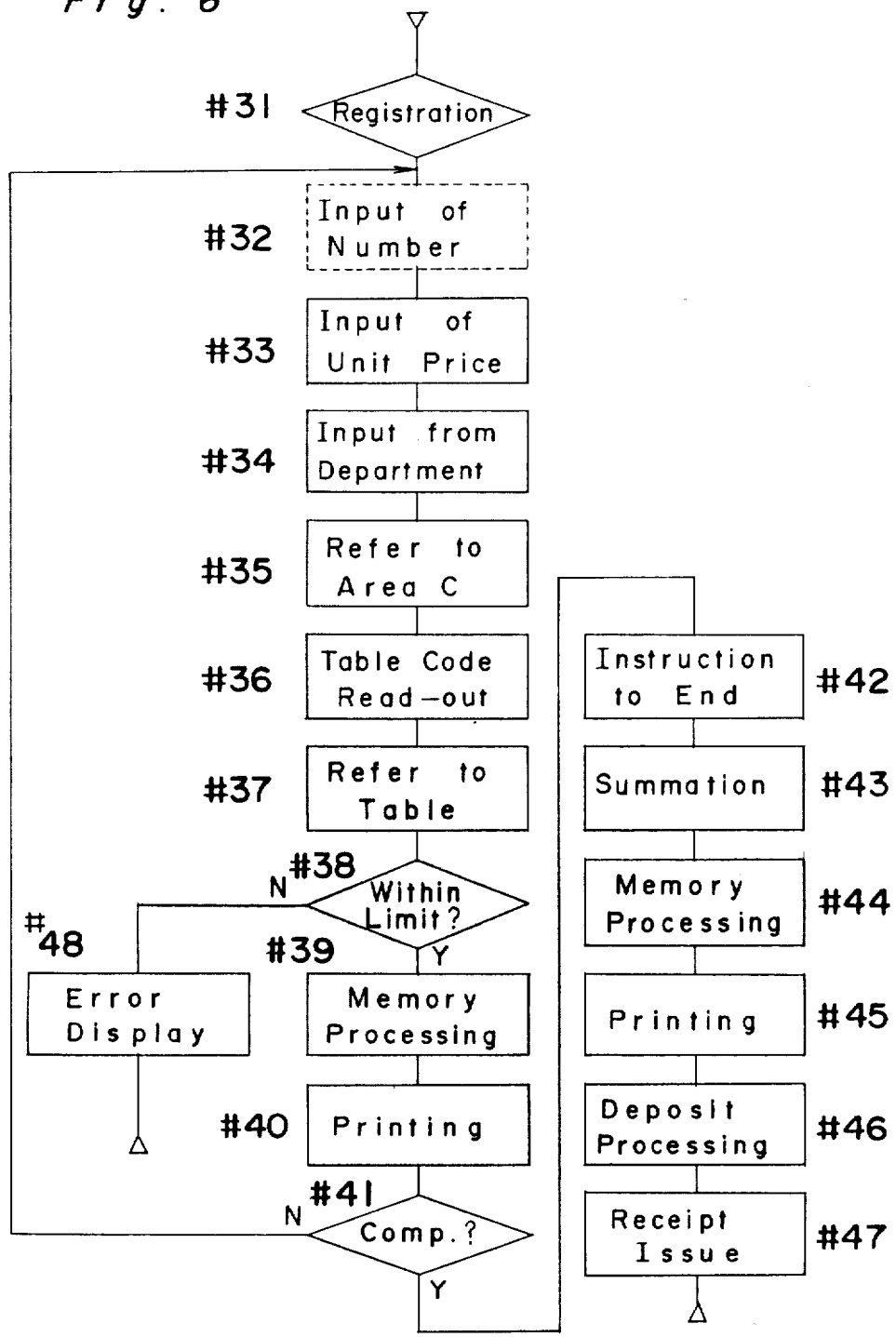
FIG. 6 is a flow chart showing the sequence of registration performed by the system.

Assuming that a transaction to be registered has occurred, the operator performs the procedures in a manner similar to that described hereinbefore to designate a registration mode, thereby selecting a program for the registration process out from the ROM 2 as shown by a REGISTRATION block #31 in FIG. 6. Then, data subsequently entered are processed according to this program.

More specifically, information of the unit price of a goods transacted is input to the CPU 1 by means of the keyboards 4 and 6 as shown by a INPUT OF UNIT PRICE block #33. By depressing a particular department key in the function keyboard 6, the CPU 1 is instructed as to the department to which the unit price information belongs, as shown by an INPUT FROM DEPARTMENT block #34. In response to the instruction from the department key depressed, the CPU 1 refers to the storage area c of the specified department as shown by a REFER TO AREA C block #35 and reads out the element number stored in that storage area as shown by a TABLE CODE READ-OUT block #36. Then, information on the upper and lower limits of money corresponding to the element number so read out are read out from the areas e, f, g and h of the table area M1 as shown by a REFER TO TABLE block π37, and the unit price information is subsequently determined as to whether or not it is within the range between the upper and lower limits, as shown by a WITHIN LIMIT? block #38. If it is determined to be out of the limit range, the display indicating the occurrence of an input error is effected as shown by an ERROR DISPLAY block #48 by means of the display unit 9. On the contrary thereto, if it is within the limit range, the CPU 1 registers and stores the information in a predetermined area in the memory unit 8 as shown by a MEMORY PROCESSING block #39 and then causes the printer 10 to print out the information as shown by a PRINTING block #40.

After the above described procedure has been repeated to complete the registration of the transaction with respect to a particular customer, the operator should depress an end-of-transaction key in the function keyboard 6 to instruct the CPU 1 that the transaction has terminated, as shown by COMP.? and INSTRUCTION TO END blocks #41 and #42, respectively.

Therefore, the CPU 1 performs a summation of the amount of money transacted as shown by a SUMMATION block #43, the total amount being added to and stored, as shown by a MEMORY PROCESSING block #44, in the storage area t where the accumulated amount of money transacted each day is stored. This total amount is subsequently printed out from the printer 10 as shown by a PRINTING block #45 and/or displayed through the display unit, and the operator looking at the display unit 9 deals with a deposit process as shown by a DEPOSIT PROCESSING block #46 and issues a receipt to the customer as shown by a RECEIPT ISSUE block #47.

As hereinbefore described, the memory area for the storage of the money table for the upper and lower limits and the money table to be used for the checking of the allowable input ranges with respect to the registration of various transactions involving money is provide so that, with respect to a function which may be subjected to money amount limits, the element numbers of the table corresponding to the upper and lower limits can be respectively preset, and reference to the money table during a transaction can be made on the basis of such preset element numbers thereby to permit desired upper and lower limits of money to be read out, whereby the desired checking of the allowable input range can be performed.

Thus, according to this invention, since the money amount table for the upper and lower limits defining the allowable input ranges with respect to the registration of transactions involving money is stored in a memory, and the upper and lower limits of money defining the allowable input range for particular kinds of transactions are set and stored as a table of codes (element number) corresponding to the amounts of money stored in the first-noted memory, the checking of the allowable input during the registration of the particular transactions of money can be performed without requiring substantial memory capacity.

Although this invention has been fully described in connection with the preferred embodiment thereof with reference to the accompanying drawings, it should be noted that various changes and modifications are apparent to those skilled in the art upon the reading of this specification. Unless such changes and modifications depart from the scope of this invention, they should be construed as included therein.

We claim:

1. An electronic cash register comprising:
   data processing means for processing data stored in and input to said cash register;
   input means associated with said data processing means for inputting to said cash register amounts of money to be registered during the course of a transaction;
   first memory means associated with said data processing means for storing a plurality of money amounts representing upper limits and lower limits of amounts of money which are permitted to be registered during the course of a transaction, said first memory means also storing a code associated with each money amount stored therein; and second memory means associated with said data processing means for storing a plurality of codes associated with a plurality of different kinds of transactions which may be executed by said cash register, said codes stored in said second memory means corresponding to said codes stored in said first memory means for defining upper and lower limits of amounts of money which are permitted to be registered by said cash register during each of said different kinds of transactions by reference to money amounts in said first memory means corresponding to codes associated with a selected kind of transaction, said data processing means comprising means for comparing money amounts input by said input means with amounts stored in said first memory means.

2. An electronic cash register as in claim 1, wherein said first memory means stores each money amount in the form of at least one significant digit and one other digit representing an exponential associated with said at least one significant digit.

3. An electronic cash register as in claim 2, wherein said first memory means stores each money amount in a form comprising three significant digits.

4. An electronic cash register as in claim 1, further comprising program storage means associated with said data processing means, said program storage means storing program information for enabling input of said codes and money amounts by said input means to said first and second memory means.

* * * * *